United States Patent
Itkin et al.

(10) Patent No.: US 6,226,556 B1
(45) Date of Patent: May 1, 2001

(54) APPARATUS WITH FAILURE RECOVERY AND METHOD THEREFORE

(75) Inventors: Yuval Itkin, Zoran; Ezra Baruch, Karkur, both of (IL)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/112,533

(22) Filed: Jul. 9, 1998

(51) Int. Cl.[7] ................................................. G05B 13/02
(52) U.S. Cl. ................................. 700/21; 700/2; 700/4; 700/293; 700/297; 713/340; 713/324; 714/23; 714/24
(58) Field of Search .................................. 700/21, 4, 2, 3, 700/82, 293, 297; 714/10, 23, 24; 713/340, 330, 322

(56) References Cited

U.S. PATENT DOCUMENTS

| | | | |
|---|---|---|---|
| 5,237,698 | * | 8/1993 | Ohmae ..................................... 714/23 |
| 5,237,699 | * | 8/1993 | Little et al. ............................. 714/23 |
| 5,339,446 | * | 8/1994 | Yamasaki et al. .................... 713/340 |
| 5,410,713 | * | 4/1995 | White et al. .......................... 713/330 |
| 5,557,777 | * | 9/1996 | Culbert ..................................... 713/2 |
| 5,630,143 | * | 5/1997 | Maher et al. ......................... 713/310 |
| 5,923,761 | * | 7/1999 | Lodenius ................................ 455/73 |
| 6,144,887 | * | 11/2000 | Kamiya et al. ......................... 700/79 |
| 6,178,523 | * | 1/2001 | Klein ...................................... 714/24 |

\* cited by examiner

*Primary Examiner*—William Grant
*Assistant Examiner*—Paul Rodriguez

(57) ABSTRACT

A radio (20) having a power supply (24); a power reservoir (25); a plurality of processors (22, 36), having inner registers which store a first flag indicating whether a power failure occurred; a plurality of memory banks (28, 38), coupled to the plurality of processors (22, 36); a power failure sensor (26), coupled to the power supply (24) and to the plurality of processors (22, 36); a power on reset unit (34), coupled to the power failure sensor (26); a clock generator (32), and a power failure recovery controller (30'), coupled to the power supply (24), the energy reservoir (25), the power failure sensor (26), the clock generator (32), the plurality of processors (22, 36) and to the power on reset unit (34). When a short power failure occurs, the power reservoir (25) supplies energy to the radio (20), the power failure recovery controller (30) notifies the plurality of processors (22, 36) that a power failure has occurred, and the plurality of processors (22, 36) write their status to the plurality of memories (28, 38), enter a predetermined state and notify the power failure recovery controller (30) that they enter the predetermined state. After receiving these signals, the power failure recovery controller disables the clock generator, until the power failure ends.

13 Claims, 8 Drawing Sheets

APPARATUS WITH FAILURE RECOVERY AND METHOD THEREFORE

FIELD OF THE INVENTION

The invention concerns a means and a method for power failure recovery.

BACKGROUND OF THE INVENTION

In many systems in which processors are utilized, short power failures can hamper the operation of the systems. A power failure is a state wherein at least one supply voltage drops to a level below which continued operation of the system will become unreliable or impossible.

The problem is more severe in mobile systems, or in systems of compact size, which has relatively small energy reservoir, which can store a limited amount of electromagnetic energy, to be supplied during a power failure. These reservoirs can supply energy for a relatively short period.

If a power failure occurs, the status of the processors in the mobile radio is not saved, causing vital information to be erased. A power failure can cause a mobile radio, which was in a receiving mode, to shut down, because the data relating to the receiving mode was erased as a result of the power failure.

Power failures, and particularly short power failures, can occur for many reasons. A short power failure can occur when the mobile radio is hit and the mobile radio battery is momentarily disconnected from the rest of the electrical circuitry of the mobile radio.

In cellular communication, radios and radio base stations (i.e.—"base") exchange data and control signals. The radio and base need to be time synchronized in order to transmit and receive signals to be properly interpreted by the radio and the base. In both radio and base there are timing units for timing events executed within the radio and the base. Short power failures within radio can cause the timing unit within radio to be reset, or be halted, resulting in a unknown gap between the timing unit of the radio and the base.

Accordingly, there is a need for an apparatus and method for maintaining the status of processors, during power failures. Accordingly there is a need for an apparatus and method for maintaining the synchronization between radio and base, regardless of any short power failures.

As used therein, the word "processor" is intended to refer to any kind of signal processor, as for example and not limited to, digital signal processors, processors and microcontrollers.

As used therein, the word "radio" or "mobile radio" is intended to refer to any kind of electrical apparatus which their components store a limited amount of energy to continue to deliver power during the whole power failure period, wherein the electrical apparatus can have a plurality of processor.

SUMMARY OF THE INVENTION

The problem underlying the invention is basically solved by applying the features laid down in the independent claims. Preferred embodiments are given in the dependent claims.

An advantage of the present invention is that it provides a short power failure recovery apparatus and method which minimizes the effect of short power failures on the system. Another advantage of the present invention is that it provides a short power failure recovery apparatus and method for maintaining the synchronization between radio and base, regardless of any short power failures.

DETAILED DESCRIPTION OF THE DRAWINGS

In the preferred embodiments disclosed herein, the invention is described in connection to a radio having a power supply. It is to be understood, however, that the principles of the invention are equally applicable to any radio having input terminals for receiving voltage supply.

Figure 1:
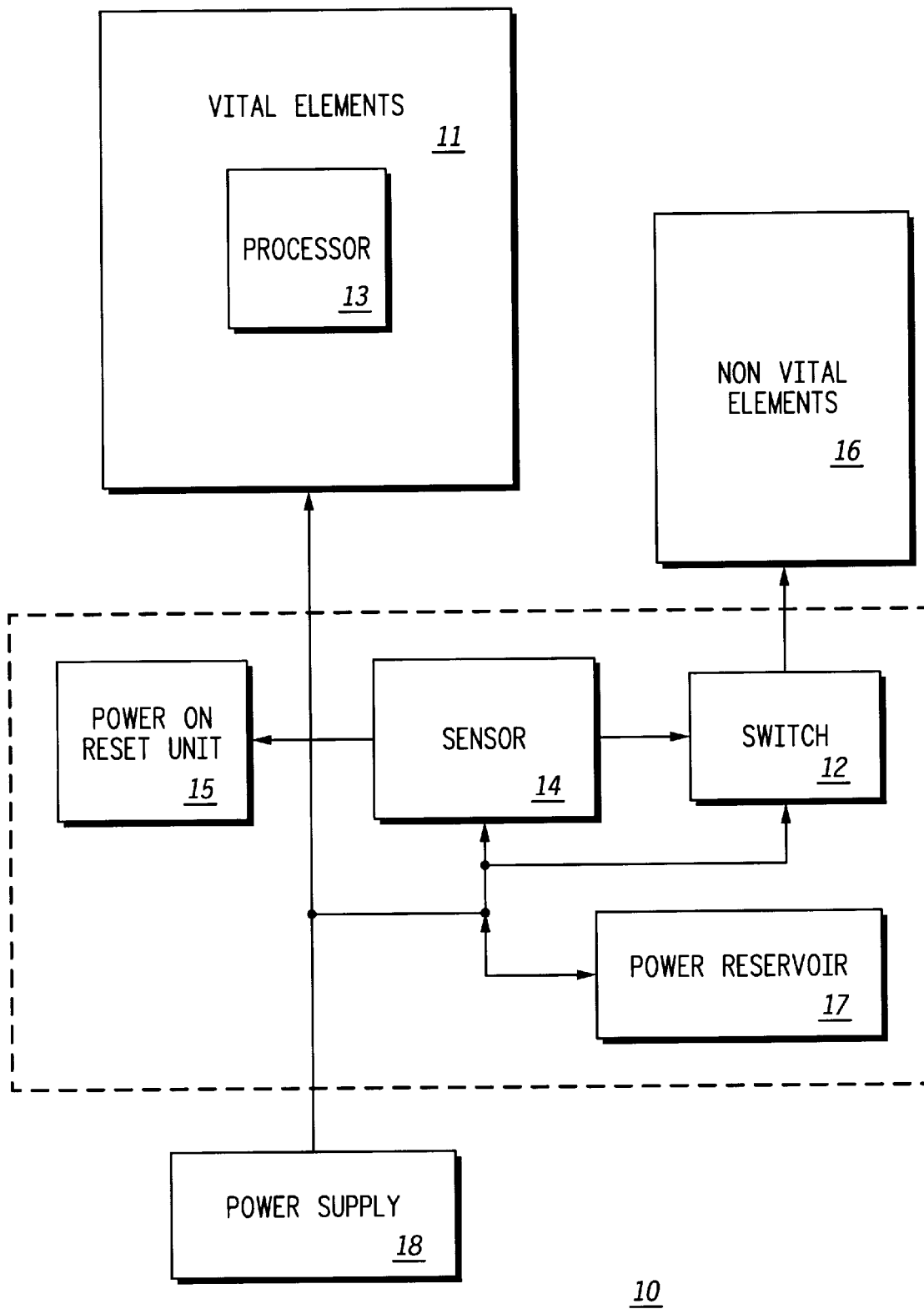
FIG. 1 is a simplified schematic diagram of a radio having a short power failure recovery circuit.

FIG. 1 is a simplified schematic diagram of radio 10 having a power failure recovery circuit 19. Radio 10 comprises: power failure sensor (i.e.—sensor) 14. Switch 12, coupled to and controlled by sensor 14. Power reservoir (i.e.—capacitors) 17, coupled to sensor 14 and switch 12. Power supply 24, coupled to capacitors 17, to sensor 14 and switch 12. Non vital elements 16 are coupled to switch 12. Vital elements 11, comprising processor 13, coupled to capacitors 17 and to power supply 18. Power on reset unit 15, coupled to processor 13 and sensor 14. For convenience of explanation the power reservoir will be referred to as capacitors, but other power reservoirs can be implemented. Vital elements 11 are elements which are essential for radio 10 operation. After some or all of these elements are shut down, radio 10 has to be initialized.

Sensor 14 is coupled to capacitors 17, for sensing when one of the supply voltages drops below a first level (i.e.—powercut level), and when this supply voltage is below a second level (i.e.—power on reset level). Preferably, the first level is higher than the second level. Power supply 18 can supply a plurality of supply voltages, but for convenience of explanation it is assumed that it supplies a single supply voltage.

Usually, when power supply 18 stops working, or when it supplies a supply voltage having a level below which continued operation of the system will become unreliable or impossible, the reservoir is discharged of electromagnetic energy. During this discharge, the level of supply voltage decreases. If the power failure is short, the supply voltage decrements by a small amount. If the power failure is relatively long, the power on reset unit 15 resets processor 13.

Sensor 14 can also be implemented by two separate sensors (not shown in FIG. 1), so that power failure recovery controller (i.e.—PFRC) 30 is coupled to a first sensor, for sensing when the supply voltage is below a powercut level, and the power on reset unit is coupled to a second sensor, for sensing when the power supply voltage is below a power on reset level. For convenience of explanation, it is assumed that sensor 14 is coupled to both PFRC 30 and power on reset unit 15.

During operation of radio 10, capacitors 17 are charged by power supply 18. Capacitors 17 are usually part of a filtering unit (not shown in FIG. 1), for smoothing the supply voltage of power supply 18. When a power failure occurs, capacitors 17 are discharged and the energy stored within capacitors 17 is consumed by radio 10 vital elements 11. Usually, processor 13 consumes a large amount of energy, causing capacitors 17 to be discharged very quickly, and causing radio 10 to be shut down.

When the supply voltage has gone below the powercut level, sensor 14 opens switch 12, so that power supply 18 and capacitors 17 are disconnected from non vital elements 16, resulting in a reduced power consumption of radio 10.

When sensor 14 senses that the supply voltage is above the powercut level, it closes switch 12, so that power supply 18 is connected to non vital elements 16.

A disadvantage of radio 10 is that some of the vital elements 11 or the non vital elements 16 can enter an unknown status, as a result of a short power failure. Another disadvantage of radio 10 is that some of the vital elements 11 or the non vital elements 16 can be damaged due to undetermined voltage levels caused by shutting down non vital elements 16. A further disadvantage radio 10 is that it is quite complex, due to need to couple vital 11 elements to power supply 18 and to couple non vital elements 16 to switch 12.

Figure 2:
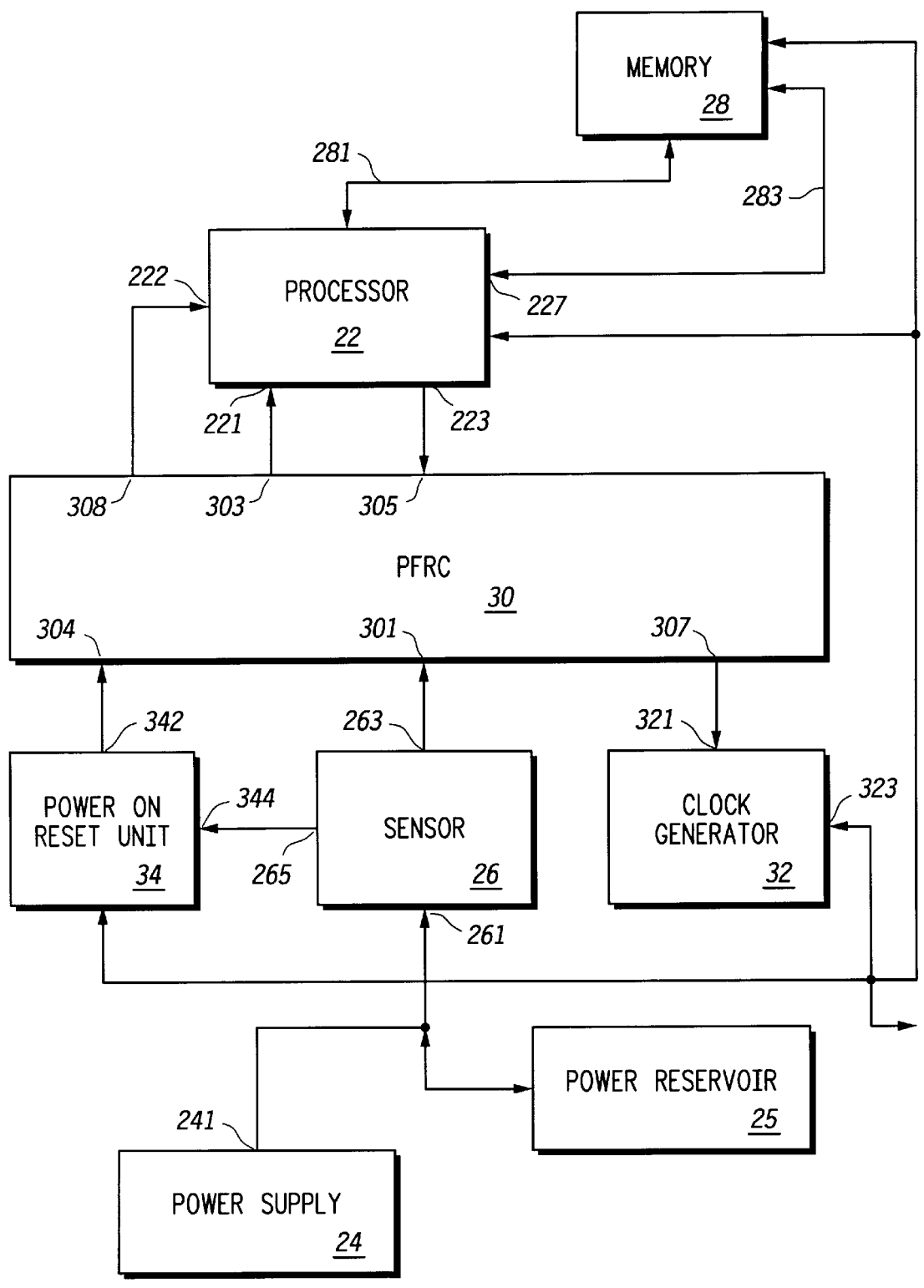
FIG. 2 is a simplified schematic diagram of a radio having a short power failure recovery circuit, according to an embodiment of the invention.

FIG. 2 is a simplified schematic diagram of radio 20, according to an embodiment of the invention. Radio 20 comprises: processor 22, having inputs 221 and 222, input/output (i.e.—I/O) 225, 227 and output 223. Power supply 24, having output 241. Sensor 26, having input 261 and output 263. Memory 28, having I/O 281 and 283. PFRC 30, having inputs 301, 304 and 305 and outputs 303, 307 and 308. Clock generator 32 having input 321 and output 323. Power on reset unit 34, having input 344 and output 342. Radio 20 can also have peripherals (not shown in FIG. 2).

Sensor 26, power reservior 25, and power on reset unit 34 of FIG. 2 are analogous to sensor 14, power reservoir 17 and power on reset unit 15 of FIG. 1, respectively.

Output 241 of power supply 24 and capacitors 25 are coupled to input 261 of sensor 26, to processor 22, to clock generator 32, to memory 28, to the peripherals, to PFRC 30 and power on reset unit 34. For convenience of explanation most of these connections are not shown in FIG. 2. Output 263 of sensor 26 is coupled to PFRC input 301. Output 307 of PFRC 30 is coupled to input 321 of clock generator 32. Output 323 of clock generator 32 is coupled to PFRC 30, to processor 22, to memory 28, to power on reset unit 34 and to peripherals. For convenience of explanation most of these connections are not shown in FIG. 2. Clock generator 32 can output a plurality of clock signals, having a plurality of frequencies, but for the convenience of explanation, the clock generator 32 is described as having a single output. PFRC 30 output 303 is coupled to processor 22 input 221. Input 305 of PFRC 30 is coupled to output 223 of processor 22. I/O 225 of processor 22 is coupled to memory 28 I/O 281. Output 227 of processor 22 is coupled to I/O 283 of memory 28. Output 342 of power on reset unit 34 is coupled to input 304 of PFRC 30. Output 308 of PFRC 30 is coupled to input 222 of processor 22.

Preferably, most or all of elements of radio 20, and especially processor 22 are made of CMOS cells. It is well known in the art that the average power dissipation P of a CMOS cell is proportional to the CMOS cell capacity C, to the voltage V applied to the CMOS cell and to the CMOS cell operating frequency F:

(see: R. L. Geiger, P. E. Allen, N. R. Strader, VLSI Design Techniques for Analog and Digital Circuits, McGraw-Hill, 1990, pg. 597–598).

The energy consumption of radio 20 is reduced by disabling the clock generator 32, so that the operating frequency equals zero, resulting in a very low power consumption of radio 20 elements, including processor 22. While the voltage supply is below the powercut level, but above the power on reset level, during short power failure, the capacitors are discharged, and the energy stored within them is consumed by radio 20 elements (such as, but not limited to processor 22, PFRC 30, memory 28, power on reset unit 34, clock generator 32 and sensor 26). Due to the very low power consumption of radio 20 components, the energy supplied by the capacitors can support radio 20 elements during a short power failure.

Those of skill in the art will understand that the invention can be implemented whenever radio 20 elements are made of cells having average power dissipation P which is proportional to the cells operating frequency F, or F by the power of k, wherein k>0.

Conveniently, processor 22 and some of radio peripherals have to enter a predetermined state before the clock generation unit is disabled. Preferably, processor 22 has to enter a halt state before the clock generator 32 is disabled. Entering a halt state enables the processor 22 to resume its operation, after power failure ends, in a relative orderly and quick manner.

When sensor 26 senses that the supply voltage is below the powercut level, it sends a signal, through output 263 to PFRC 30. Preferably, sensor 26 can be implemented by two Schmitt trigger circuits. Those of skill in the art will appreciate that other sensors can be implemented.

PFRC 30 received to at input 301 a 'CLOSE' signal indicating that there is a power failure. Desirably, the signal causes a high priority interrupt within processor 22, and, preferably, this interrupt is unmaskable by the processor programmer. Processor 22 stores, within one of its inner registers a first flag indicating that it enters a halt state as a result of a power failure.

Processor 22 sends a 'WRITE' instruction to memory 28, through I/O 283, and writes to memory 28 its status (i.e.— the content of some of its internal registers). After the status of processor is written to memory 28, it sends PFRC 30 a 'STOP' signal, through input 305 of PFRC 30, indicating that it is in a halt state. After receiving the 'STOP' signal, PFRC 30 sends clock generator 32 a 'DISABLE' signal, through input 321 of clock generator 32.

Clock generator 32 is disabled, until it receives an 'ENABLE' signal from PFRC 30, through input 321.

When sensor 26 senses that the power failure has ended, it sends a signal to PFRC, through output 263. When PFRC receives the signal it sends an 'ENABLE' signal to clock generator 32. Clock generator 32 starts to work and sends clock signals to radio 20 elements. Processor 22 reads the first flag, indicating whether processor 22 entered a halt mode as a result of a short power failure, and if the answer is 'YES' it sends memory 28 a 'READ' instruction, through I/O 283 and reads the previous status of processor 22 which is stored within memory 28.

When sensor 26 senses that a supply voltage is below the power on reset level, it sends a signal, via output 265 to input 344 of power on reset unit 34. As a result of this signal, power on reset unit 34 sends a 'RESET' signal, from output 342 to input 222 of processor 22 via input 304 and output 308 of PFRC 30, causing processor 22 to be reset.

Figure 3:
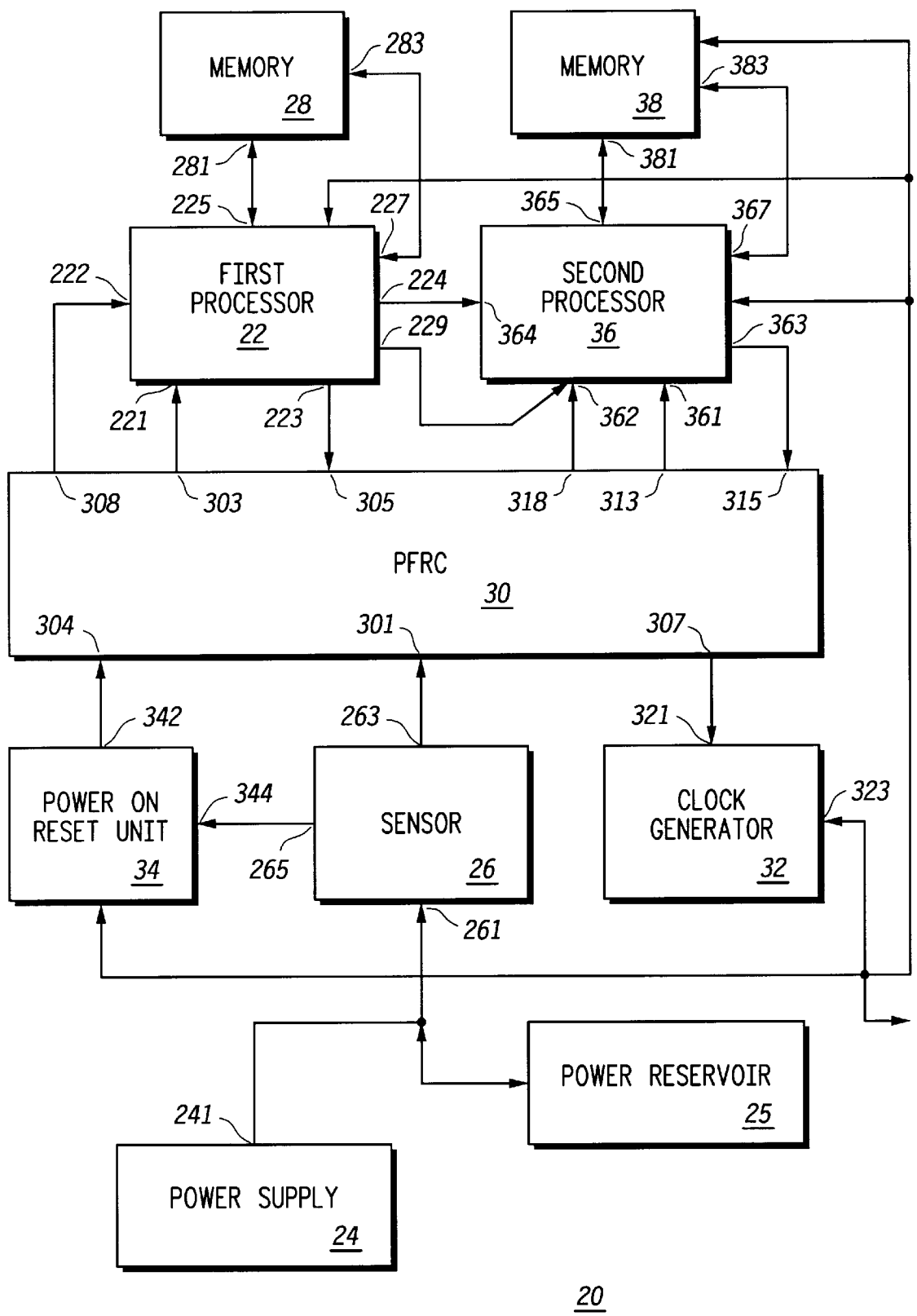
FIG. 3 is a simplified schematic diagram of a radio having a short power failure recovery circuit, according to a preferred embodiment of the invention.

FIG. 3 is a simplified schematic diagram of radio 20, according to a preferred embodiment of the invention. Radio 20 is analogues to radio 20 of FIG. 2, but it has more then one processor and its PFRC is coupled to more then one processor. For convenience of explanation it is assumed that radio 20 has an additional processor 36, but radio 20 can also have more then two processors. The same reference numbers are used to identify the same elements in FIGS. 2–3. However, their functions can be different as explained below.

As used therein, the words "first processor" is intended to refer to any processor which is coupled to another processor, wherein a 'CLOSE' signal sent to the first processor, causes the first processor to close and also can cause the first processor to activate the other processor. The other processor is referred to as "second processor".

A single processor can be defined as a both a first processor and a second processor. If, for example, processor X is coupled to two other processors, denoted as Y and Z. A 'CLOSE' signal sent to processor 'Y' can cause processor Y to activate processor X, and a 'CLOSE' signal sent to processor 'X' can cause processor X to activate processor Z. Then, processor Y is regarded as a "first processor", processor X is regarded as a "first processor" and a "second processor", and processor Z is regarded as a "second processor".

Power cut unit 30 is analogues to power cut 30 of FIG. 2, but has additional output 313 and input 315, which are analogues to input 303 and 305. First processor 22 in FIG. 3 is analogous to processor 22 in FIG. 2 but has additional outputs 224 and 229. Second processor 36 is analogous to processor 22 but has additional inputs 362 and 364. First processor 22 sends 'RESET' signals to second processor 36, via output 224 and input 364. First processor 22 sends interrupt requests to second processor 36, via output 229 and input 362. The 'RESET' signal can be sent by processor 22 after receiving a 'RESET' signal from PFRC output 309. Those who are skilled in the art will appreciate that second processor 36 can receive a 'RESET' signal directly from PFRC 30. Memory 38 is analogues to memory 28.

The processors 22 and 36 of radio 20 can interrelate so that when a 'CLOSE' signal sent to first processor 22 can cause first processor 22 to activate second processor 36, by sending an interrupt signal from its output 229 to second processor 36 input 362. First processor 22 can activate the second processor 36 as a result of receiving a signal indicating that a power failure has occurred.

First and second processors 22 and 36 can be put to halt state in various ways. PFRC 30 can send a 'CLOSE' signal, through input 221 of first processor 22, wait until the first processor 22 sends a signal indicating that it entered a halt statue, and then send a 'CLOSE' signal to second processor 36.

First and second processors 22 and 36 can be halted by receiving two 'CLOSE' signal simultaneously. Because first processor 22 can activate second processor 36, after receiving a 'CLOSE' signal, PFRC 30 contains a watchdog circuit (not shown in FIG. 3) which checks, after a predetermined period, whether the second processor 36 is in halt state. If second processor 36 is not halted, PFRC 30 sends it further 'CLOSE' signals. The watchdog circuit checks the second processor 36 status and sends 'CLOSE' signals until the second processor 36 halts.

First and second processors 22 and 36 have a first flag, and can have an additional second and third flags. The first flag indicated whether a processor entered a halt mode as a result of a short power failure. The second flag indicating whether a first (second) processor 22 (36) started to write its status to memory 28 (38). The third flag indicates whether first (second) processor 22 (36) has finished to write its status to memory 28 (38).

When first (or second) processor 22 (or 36) exits a halt state it reads the content of the second and third flags. If the flags indicate that the first (second) processor 22 (36) did not finish to write its status, the first (second) processor 22 (36) is reset. The first (second) processor 22 (36) can be reset even if it finished to store its status.

Figure 4:
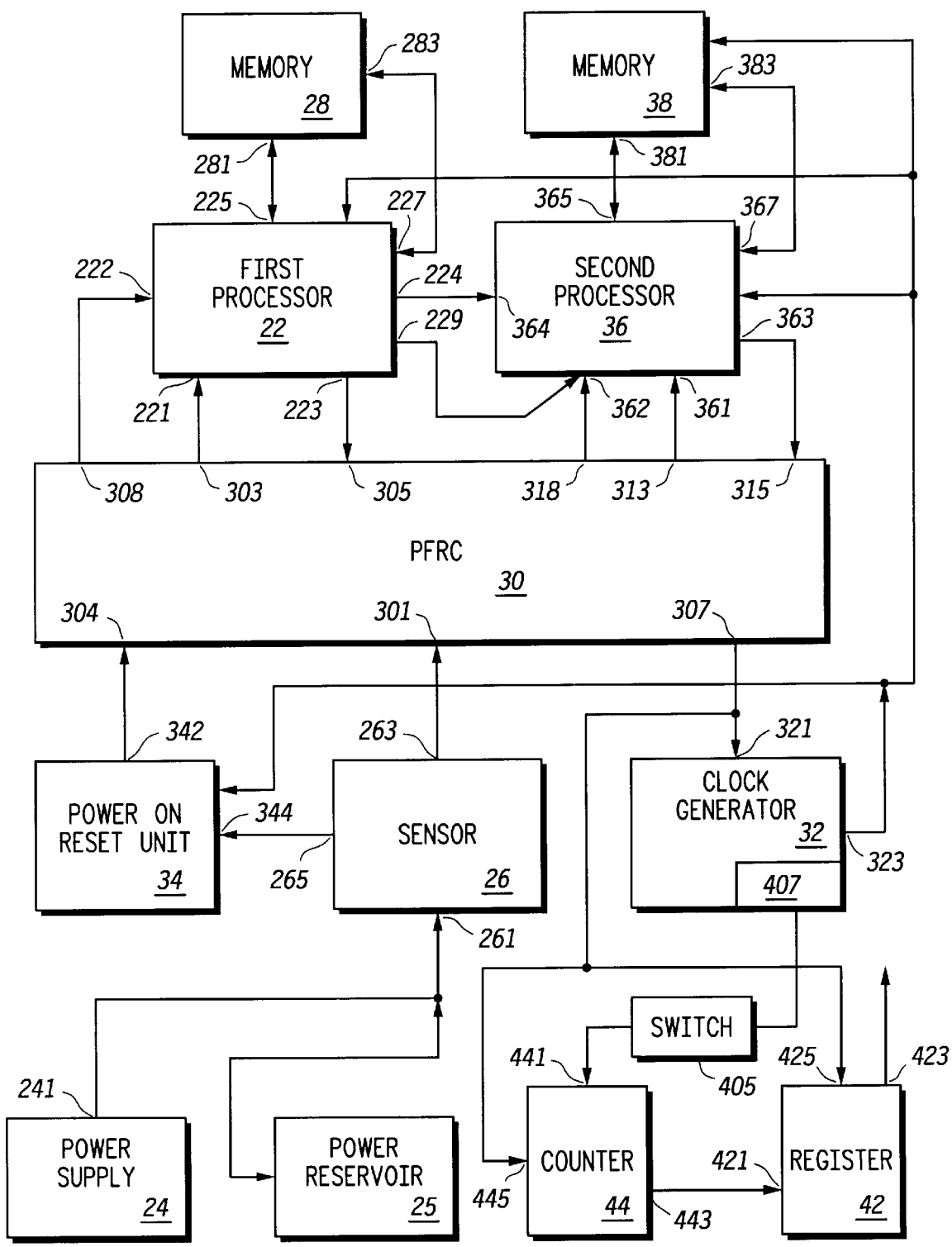
FIG. 4 is a simplified schematic diagram of a radio having a short power failure recovery circuit, according to another preferred embodiment of the invention.

FIG. 4 is a simplified schematic diagram of radio 20, according to a further preferred embodiment of the invention. Radio 20 of FIG. 4 is analogues to radio 20 of FIG. 3, but it has an additional counter 44, an additional register 42, an additional switch 405 within clock generator 32 and an additional input within first (or second) processor 22 (or 36), for reading the content of register 42. Clock generator 32 has a low frequency clock generator 407. Those who are skilled in the art will understand that the additional circuitry mentioned above can be implemented in radio 20 of FIG. 2, as well as in radio 20 of FIG. 3. The same reference numbers are used to identify the same elements in the figures.

Counter 44 has input 441, control input 445 and output 443. Register 42 has input 421, control input 425 and output 423. Low frequency clock generator 407 is coupled to counter 44 input 441 through switch 405. Register 42 content can be read by the first or second processors 22 and 36. Counter 44 control input 445 is coupled to output 307 of PFRC 30, for resetting counter 44 when a 'DISABLE' signal is sent to clock generator 32. Register 42 control input 425 is coupled to output 307 of PFRC 30.

When PFRC 32 sends an 'DISABLE' signal to clock generator 40, all clock generators are disabled, except a low frequency clock generator 407 within the clock generator 32. The 'DISABLE' is inputted to control input signal resets counter 44 and causes switch 405 to close. Counter 44 receives clock input 441 from low frequency clock generator 407 that causes it to increment (or decrement) by one count for each clock input signal. Control input 425 of register 42 receives the 'DISABLE' and 'ENABLE' signals sent by PFRC 30 so that as long that there is a 'DISABLE' signal, the register reads the content of counter 44. When the power failure ends, and a 'ENABLE' signal is sent by PFRC 30, the register stops reading the counter 44 content, so that the register 42 stores a count that represents the length of the power failure. Those who are skilled in the art will appreciate that register 42 can also read the content of counter 44 just when a 'ENABLE' signal is sent by PFRC 30.

The first and/or second processors 22 and 36 can read the content of register 42, and know the length of the power failure. If the radio has a timing unit, which has to be synchronized to a base timing unit, the first and/or second processor 22 and 36 can update the radio timing unit, according to the content of register 42.

Figure 5:
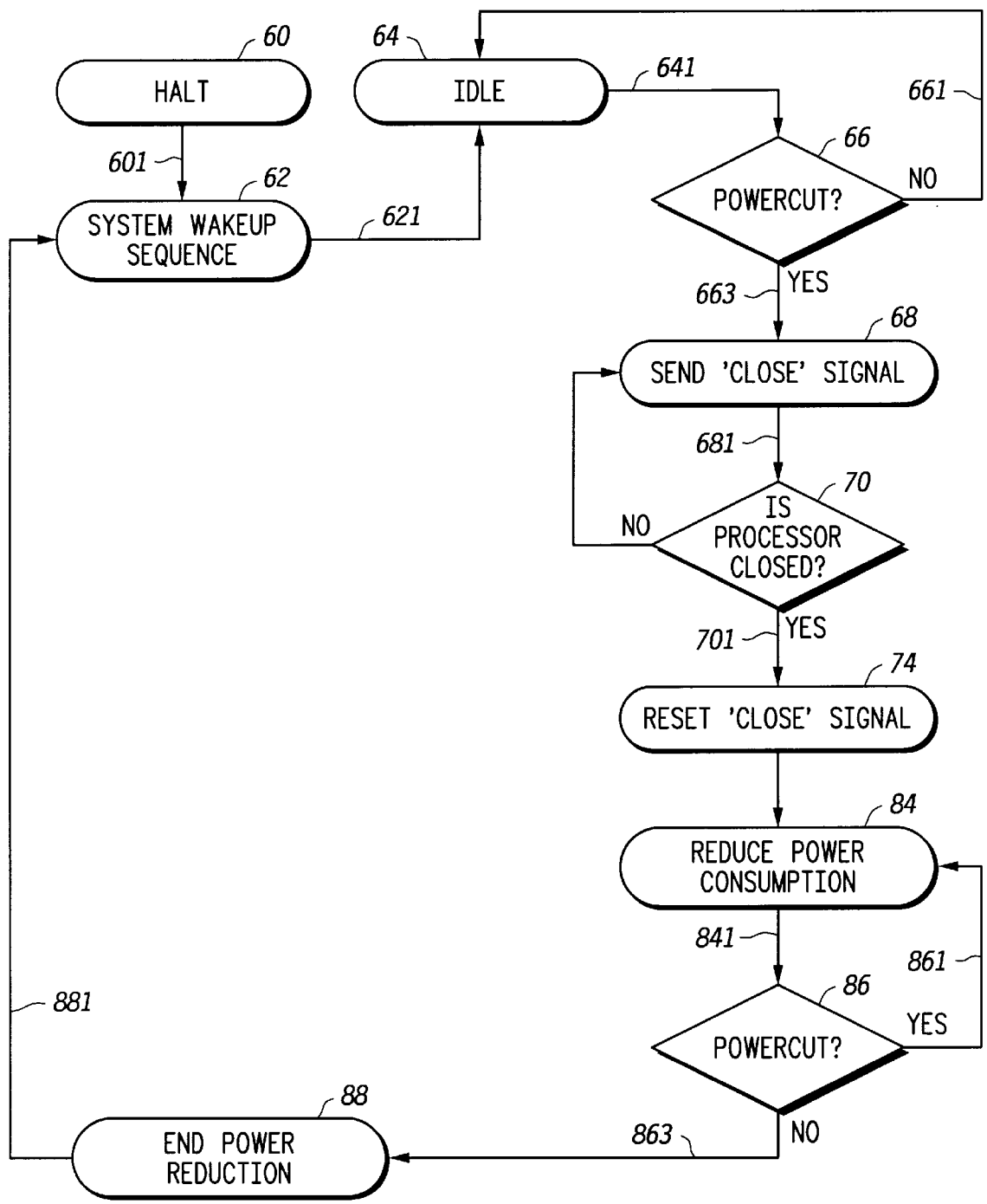
FIG. 5 is a flow chart diagram of a method for short power failure recovery, according to an embodiment of the present invention.

FIG. 5 is a flow diagram of method 50 for a power failure recovery method, according to an embodiment of the present invention. In FIGS. 5–8, arrows indicate the preferred method flow. Method 50 starts in a 'HALT' mode 60. As indicated at path 601, a 'POWER ON RESET' signal ends the halt mode and starts a 'SYSTEM WAKEUP SEQUENCE' step 62, in which the PFRC 30 is initiated (i.e.—it starts to look for power failures), and processor 22 reads the first flag indicating if a short power failure occurred. If the answer is 'YES' processor 22 sends a 'READ' signal to memory 28, and reads processor 22 status prior to the short power failure, stored within memory 28.

During any of method 50 steps, if the supply voltage drops below the power on reset level, the process continues to step 60. For convenience of explanation the paths leading from each of method 50 steps to step 60 are not shown in FIG. 5.

As indicated by path 621, step 'IDLE' 64 is executed after step 62 ends. During step 64 radio 20 can exchange data and control signals.

As indicated by paths 641, 661 and by query 'IS THE VOLTAGE BELOW POWERCUT LEVEL' step 66 PFRC 30 monitors sensor 26 in order to detect when the voltage supplied by radio voltage supply is below a powercut level. If the answer is 'NO' then method 50 remains in step 64. If the answer is 'YES' then sensor 26 sends a signal to PFRC 30, and the PFRC 30 sends a 'CLOSE' signal to processor 22, during step 68. As a result of the 'CLOSE' signal, processor 22 sets its first flag indicating that a short power failure occurred, sends a 'WRITE' signal to memory 28, and writes processor 22 status to memory 28. As indicated by path 681, step 68 is followed by query 'IS PROCESSOR CLOSED'?' step 70, in which the PFRC 30 monitors its input in order to detect a 'STOP' signal from processor 22. As indicated by path 701, after receiving a 'STOP' signal, the PFRC 30 resets its 'CLOSE' signal, during step 74. At step 84, which follows step 74, PFRC 30 sends a 'DISABLE' signal to clock generator 32, which deactivates clock generator 32. Step 84 is conveniently followed by query 'IS THE VOLTAGE BELOW POWERCUT LEVEL?' step 86, so that while clock generator is disabled 32, PFRC 30 monitors sensor 26 in order to detect if the supply voltage is above the powercut level. As indicated by path 861, if the answer is 'YES' then method 50 goes to step 84. As indicated by path 863, if the answer is 'NO' then during step 88, sensor 26 sends a signal to PFRC 30, the PFRC 30 send an 'ENABLE' signal to clock generator 32, activating clock generator 32. As indicated by path 881, after clock generator 32 is activated, method 50 goes to step 62.

Figure 6:
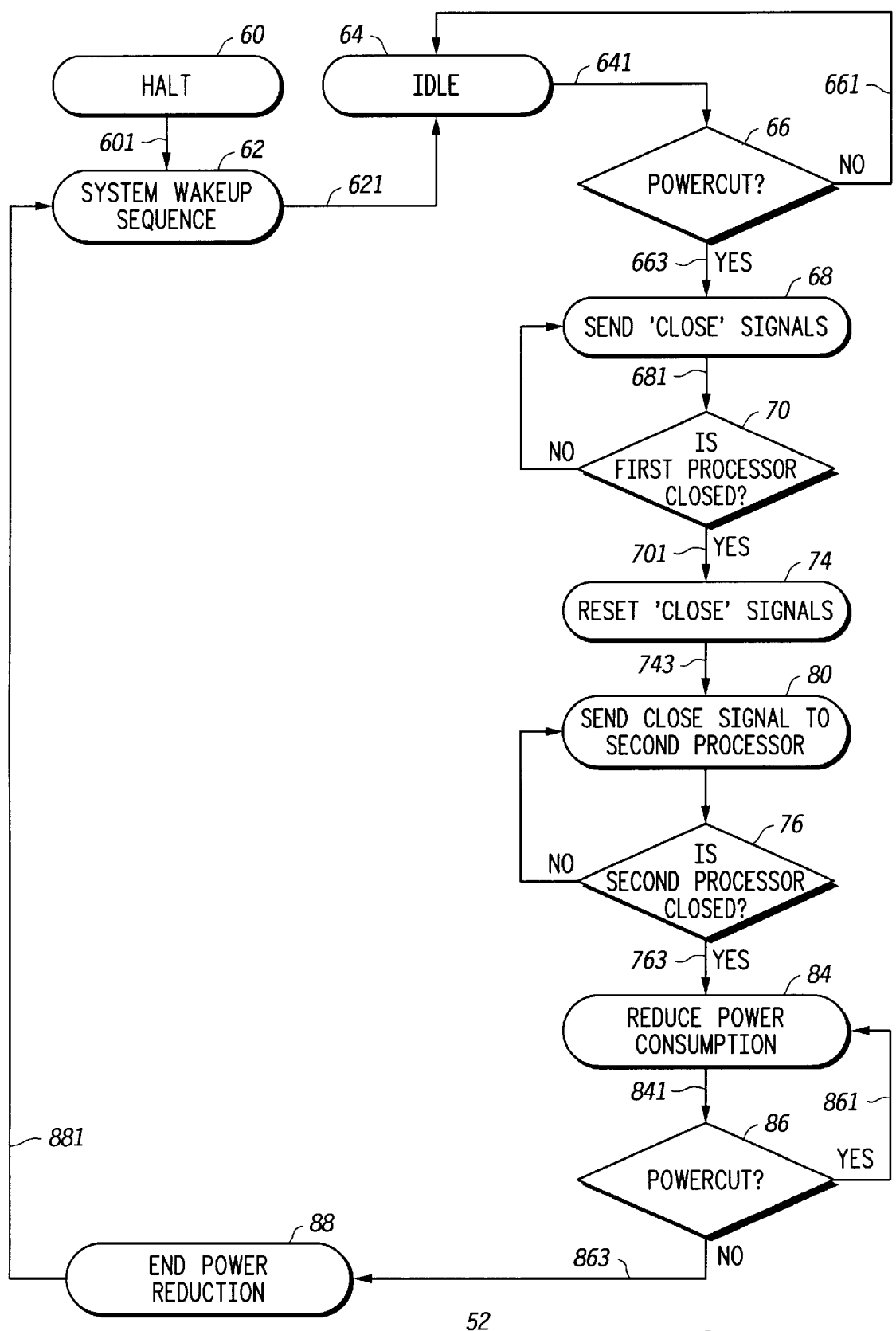
FIG. 6 is a flow chart diagram of a method for short power failure recovery, according to a preferred embodiment of the present invention.

FIG. 6 is a flow diagram of method 52 for a power failure recovery method, according to another embodiment of the present invention. Method 52 is analogous to method 50 but has two additional steps 76 and 80, and three modified steps 62, 68 and 74.

During modified step 62 first and second processors 22 and 36 check their first flags in order to determine if a short power failure occurred. If the answer is 'YES' both processors read their previous status from memories 28 and 38.

During modified step 68 PFRC 30 sends first and second processors 22 and 36 a 'CLOSE' signal.

During modified step 74 PFRC 30 resets the 'CLOSE' signals sent to first and second processors 22 and 36.

Query 'IS THE SECOND PROCESSOR STOPPED' step 76 follows step 74, as indicated by path 743. During step 76 PFRC 30 checks if second processor 36 is in a halt mode. Step 76 is needed because first processor 22 can activate second processor 36 when first processor 22 enters a halt state. As indicated by path 763, if the answer is 'YES' PFRC 30 sends a 'DISABLE' signal to clock generator 32, during step 84. If the answer is 'NO' PFRC 30 sends a 'CLOSE' signal to the second processor, during step 80. Steps 76 and 80 are coupled so that a 'CLOSE' signal is sent to second processor 36 until second processor 36 halts and sends a 'STOP' signal to PFRC 30. After receiving a 'STOP' signal from second processor 36, PFRC 30 disables clock generator, as described in FIG. 6.

Figure 7:
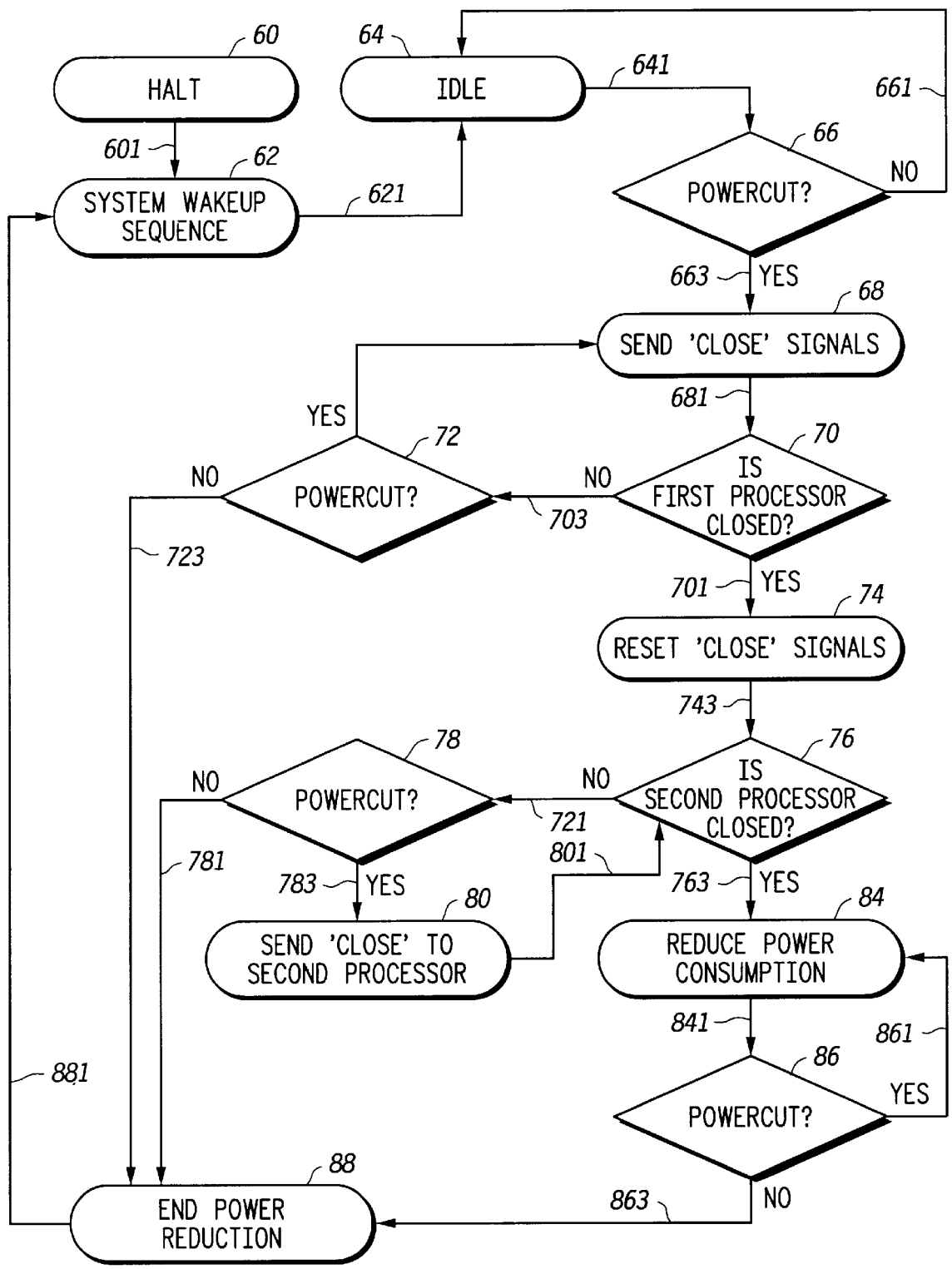
FIG. 7 is a flow chart diagram of a method for short power failure recovery, according to another preferred embodiment of the present invention.

FIG. 7 is a flow diagram of method 54 for a power failure recovery method, according to another preferred embodiment of the present invention. Method 54 is analogous to method 52 but has additional steps 72 and 78 and additional paths 703, 721, 763, 783 and 781 that allow the first and second processors 22 and 36 to ignore very short power failures. During step 70 PFRC 30 monitors its input in order to detect a 'STOP' signal from first processor 36. If first processor 36 does not send a 'STOP' signal, PFRC 30 checks if sensor 26 senses a power failure, during step 72. If the answer is 'NO' then, as indicated by path 723, method 54 goes to step 88. If sensor 26 still senses a power failure, method 54 goes to step 68.

During step 76 PFRC 30 monitors its input in order to detect a 'STOP' signal from second processor 36. If second processor 36 does not send a 'STOP' signal, PFRC 30 checks if sensor still senses a power failure, during step 78. If the answer is 'NO' then, as indicated by path 781, method 54 jumps to step 88. If sensor 26 still senses a power failure, method 54 jumps to step 80.

If the first and second processors 22 and 36 have the second and third flags, then these flags are read during step 62. If these flags indicate that the first (second) processor 22 (36) did not finish to write its status, the first (second) processor 22 (36) is reset. The first (second) processor 22 (36) can be reset even if it finished to store its status.

Figure 8:
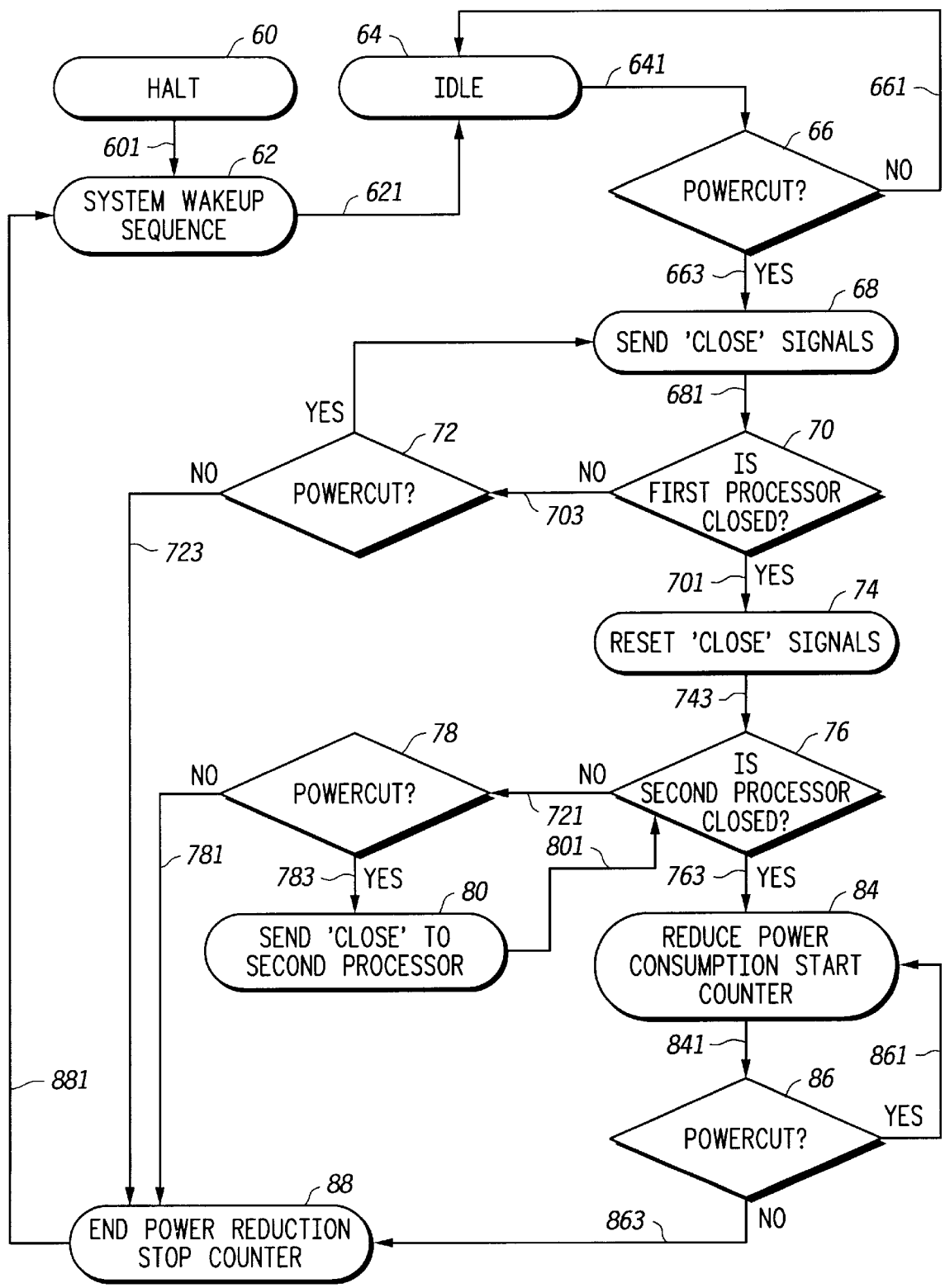
FIG. 8 is a flow chart diagram of a method for short power failure recovery, according to yet another preferred embodiment of the present invention

FIG. 8 is a flow diagram of method 56 according to yet another preferred embodiment of the present invention. Method 56 is analogous to method 54 but has two modified steps 84 and 88. These two steps enable to measure the length of the period time in which clock generator 32 was disabled. Modified steps 84, and 84 replace steps 84 and 88 respectively, of any of methods 50–54 described in FIGS. 5–9.

In modified step 84, PFRC 30 sends a 'DISABLE' signal to clock generator 32. This signal disables all clock generator units within clock generator 32 except of low frequency clock generator 407 which is coupled to counter 44. The 'DISABLE' signal resets counter 44 and couples between counter 44 and low frequency clock generator 407. The 'DISABLE' signal triggers register 42 to read counter 44 content.

In modified step 88, the 'ENABLE' signal, sent by PFRC 30, disconnects counter 44 from low frequency clock generator 407 and disables register 42 from reading the content of counter 44. Register 42 stores counter 44 count which represents the length of the period in which clock generator 32 was enabled.

It will be understood by those skilled in the art that various changes in form and detail can be made without departing from the spirit and scope of the invention which is determined by the claims that follow.

What is claimed is:

1. An apparatus comprising:
   a power supply;
   an energy reservoir, coupled to the power supply, for receiving energy from the power supply and for supplying voltage when a power failure occurs;
   a processor, coupled to the power supply and to the energy reservoir; wherein as a result of power failures the processor enters a predetermined mode;

a memory, coupled to the processor, for storing a status of the processor;

a power failure sensor, coupled to the power supply, for sensing when the supply voltage is below or above a first level;

a power failure recovery controller, coupled to the power supply, the energy reservoir, the power failure sensor, and to the processor; wherein the power failure recovery controller notifies the processor when the supply voltage is below the first level and when the supply voltage raises above the first level, wherein after the processor enters a predetermined state, the power failure recovery controller reduces power consumption of the apparatus;

a plurality of further processors and a plurality of further memories; and wherein each processor is coupled to one of the memories, for storing and reading the processor statuses; and a clock generator, coupled to the power failure recover controller, to the plurality of processors, and to the plurality of memories, wherein most of all of the plurality of processors and memories are built from cells, wherein a cell average power dissipation P is proportional to the cell operating frequency F by the power of k, k>0, and wherein the power failure recovery controller reduces the power consumption of the apparatus by disabling the clock generator.

2. The apparatus of claim 1 further comprising a power on reset unit, coupled to the power failure sensor, for resetting the plurality of processors when the supply voltage, which was below a second level, raised above the second level; and wherein the power failure sensor can sense the supply voltage is below a first level and below a second level.

3. The apparatus of claim 2 wherein when the power failure sensor senses that the supply voltages is below the first level, it sends a first signal to the power failure recovery controller;

wherein when the power failure sensor senses that the supply voltage, which was previously below the first level, raises above the first level, it sends a second signal to the power failure recovery controller;

wherein when the power failure sensor senses that the supply voltage is below the second level, it sends a third signal to the power on reset unit; and wherein when the power failure sensor senses that the supply voltage which was previously below the second level, raises above the second level, it sends a fourth signal to the power on reset unit.

4. The apparatus of claim 3 wherein when the power failure recovery controller receives the first signal, the power failure recovery controller sends a 'CLOSE' signal to the processor;

wherein, as a result of the 'CLOSE' signal the processor writes to the memory its current state, sets a first flag in its register, sends the power failure recovery controller a 'STOP' signal, indicating that it entered a predetermined status;

wherein after the power failure recovery controller receives the 'STOP' signal it sends 'DISABLE' signal which disables the clock generator; and wherein when the power failure recovery controller receives the second signal the power failure recovery controller sends an 'ENABLE' signal which enables the clock generator.

5. The apparatus of claim 1 wherein the cells are CMOS cells.

6. An apparatus comprising:

a power supply;

an energy reservoir, coupled to the power supply, for receiving energy from the power supply and for supplying voltage when a power failure occurs;

a first processor, coupled to the power supply and to the energy reservoir; wherein as a result of power failures the first processor enters a predetermined mode;

a memory, coupled to the first processor, for storing a status of the first processor;

a power failure sensor, coupled to the power supply, for sensing when the supply voltage is below or above a first level; and a power failure recovery controller, coupled to the power supply, the energy reservoir, the power failure sensor, and to the first processor; wherein the power failure recovery controller notifies the first processor when the supply voltage is below the first level and when the supply voltage raises above the first level, wherein after the first processor enters a predetermined state, the power failure recovery controller reduces power consumption of the apparatus;

wherein the first processor can activate a second processor, after receiving an indication that the supply voltage is below the first level.

7. The apparatus of claim 6 wherein when the supply voltage is below the first level, the power failure recovery controller sends a 'CLOSE' signals to all the processors simultaneously;

wherein power failure recovery controller checks the status of the second processor, in a periodical manner, and sends it 'CLOSE' signals until the second processor enters a predetermined status.

8. An apparatus comprising:

a power supply;

an energy reservoir, coupled to the power supply, for receiving energy from the power supply and for supplying voltage when a power failure occurs;

a processor, coupled to the power supply and to the energy reservoir; wherein as a result of power failures the processor enters a predetermined mode;

a memory, coupled to the processor, for storing a status of the processor;

a power failure sensor, coupled to the power supply, for sensing when the supply voltage is below or above a first level; and a power failure recovery controller, coupled to the power supply, the energy reservoir, the power failure sensor, and to the processor; wherein the power failure recovery controller notifies the processor when the supply voltage is below the first level and when the supply voltage raises above the first level, wherein after the processor enter a predetermined state, the power failure recovery controller reduces power consumption of the apparatus; and a low frequency clock generator, which is activated during the power failure;

a counter, coupled to the low frequency clock generator, and to the power failure recovery controller; wherein the counter is reset at the beginning of the power failure; wherein the low frequency clock generator causes the counter to increment, so that the counter measures the length of the power failure;

a register, coupled to the counter and to the processor, for storing the content of the counter and wherein the processors can read the register.

9. The apparatus of claim 8, wherein the apparatus communicates with a base radio station, wherein the base station and the apparatus each have a timing unit, wherein the timing units need to be synchronized; and wherein after the occurrence of a power failure, the timing unit of the apparatus is updated, according to the register content.

10. A method for operating an apparatus having a processor, a power reservoir, and a power failure recovery controller, comprising the steps of:

sensing if a supply voltage provided by the power reservoir is below a first level;

if 'YES', storing a status of the processor;

notifying the power failure recovery controller that the status was stored and entering a predetermined mode;

reducing power consumption of the apparatus;

sensing if one or more of the supply voltages is above a first level;

if 'YES', ending the reduction in power consumption of the apparatus;

reading the status of the processor from a memory;

wherein as long as the supply voltage is below the first level, substantially sending power from the power reservoir wherein if the supply voltage is below a first level:

sending a 'CLOSE' signal to the processor and a further processor;

checking if a 'STOP' signal arrived;

if a 'STOP' signal did not arrive, checking if the voltage supply is still under the first level and if 'NO' go to initialization step, if 'YES' reducing the power consumption of the apparatus;

if a 'STOP' signal did arrive, reducing the power consumption of the apparatus;

sensing if the supply voltage that was below a first level is above the first level; and if 'YES' ending the reduction of power consumption.

11. A method for operating an apparatus having a first processor and a second processor, a power reservoir, and a power failure recovery controller, comprising the steps of:

initializing the apparatus;

sensing if a supply voltage provided by the power reservoir is below a first level;

if 'YES', storing a status of the first processor and the second processor;

notifying the power failure recovery controller that the status of the first processor was stored and entering a predetermined mode;

checking if the second processor has entered the predetermined mode;

if 'YES' disabling a clock generator;

if 'NO' sending 'CLOSE' signals to the second processor until the second processor sends a 'STOP' signal;

reducing energy consumption of the apparatus;

sensing if the supply voltage that was below a first level is above the first level;

if 'YES' ending the reduction of energy consumption;

wherein the length of a power failure is measured by a counter; and wherein the processor can read the content of the counter.

12. The method of claim 11 wherein the apparatus communicates with a base radio station; wherein the base station and the apparatus each have a timing unit; wherein the timing units need to be synchronized; and wherein after the occurrence of a power failure, the timing unit of the apparatus is updated, according to the content of the counter.

13. The method of claim 11 wherein after sensing that the supply voltage is below a first level, sending a 'CLOSE' signal to the first processor and the second processor;

checking if a 'STOP' signal arrived from the first processor;

if a 'STOP' signal did not arrive, checking if the supply voltage is still under the first level and if 'YES' sending a 'CLOSE' signal to the first processor and the second processor; if 'NO' go to initialization step;

if a 'STOP' signal did arrive, resetting the 'CLOSE' signal sent to the first processor and the second processor;

checking if a 'STOP' signal arrived from the second processor;

if a 'STOP' signal did not arrive, checking if the voltage supply is still under the first level and if 'YES' sending a 'CLOSE' signal to the second processor; if 'NO' go to initialization step;

reducing power consumption of the apparatus;

sensing if the supply voltage that was below a first level is above the first level; and if 'YES' ending the reduction of power consumption.

* * * * *